UNITED STATES PATENT OFFICE.

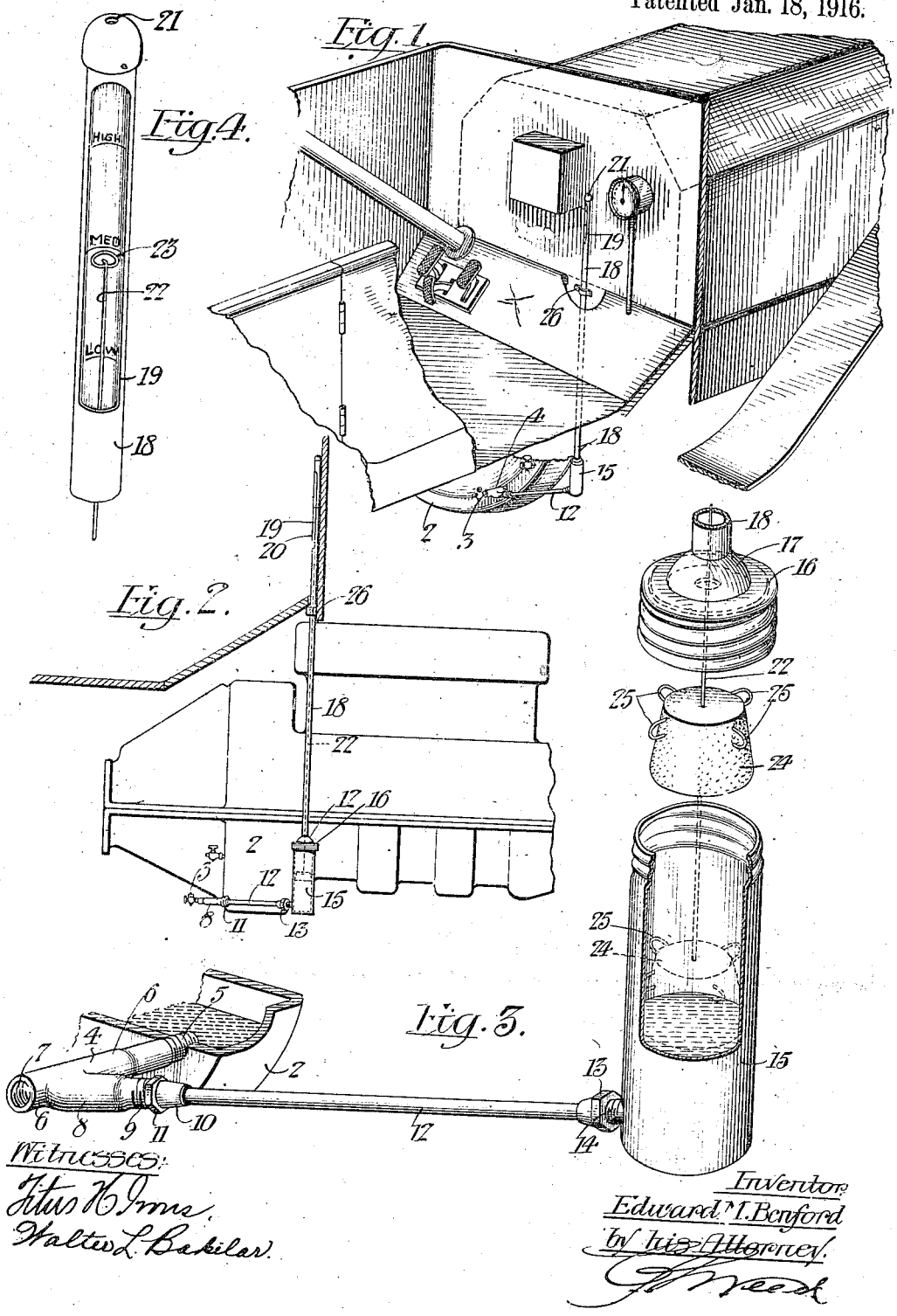

EDWARD M. BENFORD, OF MOUNT VERNON, NEW YORK.

OIL-GAGE.

1,168,468.  Specification of Letters Patent.  Patented Jan. 18, 1916.

Application filed February 25, 1915. Serial No. 10,459.

*To all whom it may concern:*

Be it known that I, EDWARD M. BENFORD, a citizen of the United States, residing at Mount Vernon, in the county of Westchester and State of New York, have invented certain new and useful Improvements in Oil-Gages, of which the following is a specification.

This invention relates to oil gages, and more particularly to a device of this kind which is particularly adapted for use with that type of automobile known as the Ford, the object of the invention being to provide a simple and inexpensive oil gage which will accurately indicate the quantity of oil in the oil reservoir or crank case of the engine from which the cylinders, pistons, etc., are automatically lubricated in the well known manner.

The particular object of the present improvement is to provide an oil gage which can be quickly and readily attached without the necessity of bending the connecting pipe and in which the parts forming the gage are very much simplified and reinforced, and in which also the oil in the oil cup or cylinder, when the oil is heavy or gummy, will not prevent the working of the gage.

In the drawings accompanying and forming part of this specification, Figure 1 illustrates a portion of a Ford automobile with this improved gage attached; Fig. 2 is a side view of a portion of the engine illustrating the position of the gage; Fig. 3 is an enlarged partly sectional view showing in detail this improved gage; and Fig. 4 is a view of the indicating portion of the gage.

Similar characters of reference indicate corresponding parts throughout the several figures of the drawings.

Ordinarily in oil gages of this general type it has been found necessary to bend the tube connecting the crank case with the oil cup or cylinder in order to properly attach the device. This is sometimes not an easy operation and is also liable to fracture or split the tube, especially when the tubes are thin or weak-walled, thus preventing the proper operation of the device. Furthermore, in devices of this kind, when the oil is heavy or becomes gummy, as in winter time, it causes the float to stick to the sides of the oil cup or cylinder and this also prevents the proper operation of the device.

The object of the present improvement therefore is to provide an oil gage which is not only simple and inexpensive, but which overcomes the defects hereinbefore stated, as well as other defects such as weak construction usually present in inexpensive devices of this character.

The Ford automobile to which this device is particularly applicable, although it may be used with other automobiles of similar type, is provided with a pair of pet cocks in the fly wheel casing 2, one above the other, and the present improvement is designed for attachment to the casing at the point where the lower pet cock 3 is ordinarily located, and for the purpose of preventing the bending of the usual brass or copper connecting pipe I have provided an improved connection comprising in the present instance a Y-shaped member 4. One branch, as 6, of this Y-shaped member is exteriorly threaded at one end, as at 5, this being the longer branch of the two, so that it can be readily turned into the threaded opening of the crank case from which the lower pet cock 3 is removed. The opposite end of this branch is internally threaded as at 7 for the reception of the removed pet cock 3, whereby this pet cock may still be utilized, should occasion require, in the same way as it could be used when in the crank case. The other branch 8 of the Y member is likewise exteriorly threaded as at 9 for the reception of a suitable packing box or coupling 10 which is of tapered form and is provided with a nut-receiving portion 11, and this coupling member fits the end of a straight connecting pipe 12 which is outwardly flanged at its ends so as to retain the coupling member thereon and make a tight oil proof joint. The connecting pipe 12 is provided at its opposite end with a similar sliding coupling member 13 adapted to be turned onto a threaded nipple 14 carried at the side of the oil cylinder or cup 15. Threaded on the upper end of this oil cup is a removable cap or closure 16 having a reinforcing dome-shaped portion 17 by means of which the gage tube 18 is connected.

The gage tube 18, which may be made of any suitable material, as of brass, is provided with a cut-away portion to form a sight opening 19, and inside this tube at this portion is fitted a transparent member which may be of glass, celluloid or similar material, and which may be in the form of a tube 20 closely fitting the brass tube at this point.

In the present instance a celluloid transparent member is used for this purpose, and carried within the tube at the rear thereof are suitable indicating marks, that is high, low and medium, to indicate the height of the oil. In the present instance these marks are made on paper, and this may be placed between the celluloid tube and the rear of the brass tube. The top of the tube is provided with an air hole 21. Located within the tube is an indicator in the form of a rod or wire 22 having an enlarged head 23 shown bent from the end of the wire, the lower end of this rod having connected thereto a suitable float 24, shown in the present instance as a piece of cork which may be suitably shellacked, and which cork is provided with a plurality of open guides 25 projecting from the sides thereof to space the float from the sides of the cup casing whereby should the oil become gummy it will not interfere with the proper working of the float. Between the top of the float and the top of the closure may be located a packing disk washer.

The gage tube 18 is connected to the dash below the foot board by a suitable strap 26 and projects above the foot board a sufficient distance to enable the quantity of oil in the casing to be quickly determined. When the oil in the casing is at the height of the lower pet cock or at the height of the Y-connection, it is in the position marked low on the gage, and when at the height of the upper pet cock it is in the position marked high on the gage.

By means of the improved Y-connection the necessity of bending the connecting pipe 12 is entirely avoided, and at the same time this connection facilitates the ready and quick attachment of the gage in position, and by means of the improved float shown the liability of the oil preventing the proper working of the gage is obviated, while the general construction is so simple in the number of its parts and in the manner in which it is constructed that it is inexpensive to make, while strong and durable in use.

I claim as my invention:—

1. An oil gage comprising an oil cup, an indicating tube connected therewith and having a sight opening, an indicator movable in said tube, a float in said cup and connected with said indicator, a connecting pipe, and a Y-connection for connecting said pipe with the reservoir of an engine.

2. An oil gage comprising an oil cup, an indicating tube connected therewith and having a sight opening, an indicator movable in said tube, a float in said cup and connected to the lower end of said indicator, means relatively carried by the cup and float for preventing the sticking of the float, a connecting pipe, and a Y-connection for connecting said tube with the reservoir of an engine.

3. An oil gage comprising an oil cup, an indicating tube connected therewith and having a sight opening, an indicator movable in said tube, a float in said cup and connected to the lower end thereof, means relatively carried by the cup and float for preventing the sticking of the float, a straight pipe, and a Y-connection for connecting said pipe with the reservoir of an engine, one branch of said Y-connection being exteriorly threaded at one end and interiorly threaded at the other, and a shorter exteriorly threaded branch portion.

4. An oil gage comprising an oil cup, an indicating tube connected therewith and having a sight opening, an indicator movable in said tube, a float in said cup and connected with the lower end of said indicator, means relatively carried by the cup and float for preventing the sticking of the float, a connecting pipe, a Y-connection for connecting said pipe with the reservoir of an engine, and a pair of sliding coupling members connecting the pipe with the oil cup and with the Y-connection.

EDW. M. BENFORD.

Witnesses:
PHILIP A. MURRAY,
DAVID LEVIN.